(12) United States Patent
De Wit et al.

(10) Patent No.: US 12,549,870 B2
(45) Date of Patent: Feb. 10, 2026

(54) IMAGING DEVICE, OPTOELECTRONIC DEVICE AND METHOD FOR OPERATING AN IMAGING DEVICE

(71) Applicant: ams Sensors Belgium BVBA, Berchem (BE)

(72) Inventors: Pieter De Wit, Dessel (BE); Adi Xhakoni, Kessel Lo (BE); Koen Ruythooren, Hever (BE)

(73) Assignee: ams Sensors Belgium BVBA, Berchem (BE)

( * ) Notice: Subject to any disclaimer, the term of this patent is extended or adjusted under 35 U.S.C. 154(b) by 3 days.

(21) Appl. No.: 18/836,762

(22) PCT Filed: Feb. 3, 2023

(86) PCT No.: PCT/EP2023/052645
§ 371 (c)(1),
(2) Date: Aug. 8, 2024

(87) PCT Pub. No.: WO2023/152035
PCT Pub. Date: Aug. 17, 2023

(65) Prior Publication Data
US 2025/0142226 A1    May 1, 2025

(30) Foreign Application Priority Data
Feb. 9, 2022 (DE) .................... 10 2022 103 037.7

(51) Int. Cl.
*H04N 25/589* (2023.01)
*H04N 25/616* (2023.01)
*H04N 25/78* (2023.01)

(52) U.S. Cl.
CPC ......... *H04N 25/589* (2023.01); *H04N 25/616* (2023.01); *H04N 25/78* (2023.01)

(58) Field of Classification Search
None
See application file for complete search history.

(56) References Cited

U.S. PATENT DOCUMENTS 8,405,750 B2   3/2013   Smith et al.
8,754,357 B2   6/2014   Meynants et al.
(Continued)

FOREIGN PATENT DOCUMENTS

DE  202016105510 U1  12/2016
EP      3930309 A1   12/2021
(Continued)

OTHER PUBLICATIONS

International search report issued for the corresponding international patent application No. PCT/EP2023/052645 dated Mar. 27, 2023, 2 pages (only for informational purposes).
German search report issued for the corresponding German patent application No. 102022103037.7, dated Dec. 8, 2022, 7 pages (only for informational purposes).
(Continued)

*Primary Examiner* — Mark T Monk
(74) *Attorney, Agent, or Firm* — VIERING, JENTSCHURA & PARTNER MBB (57) ABSTRACT

An image sensor includes a pixel array having a first pixel group and a second pixel group. Each pixel group includes a plurality of pixels, with each pixel having a photosensitive element, a sense node and a sample-and-hold stage. A driver circuit of the image sensor, during an exposure phase, is configured to operate the pixels of the first pixel group to perform a first exposure of a first duration, and to operate the pixels of the second pixel group to perform a second exposure of a second duration followed by a third exposure of a third duration. An output circuit of the image sensor, during a readout phase, is configured to read out a first photo signal from each pixel of the first pixel group, and to read out a second photo signal and a third photo signal from each pixel of the second pixel group.

18 Claims, 7 Drawing Sheets

(56) References Cited

U.S. PATENT DOCUMENTS

| | | |
|---|---|---|
| 9,706,142 B2 | 7/2017 | Hynecek |
| 2013/0135486 A1 | 5/2013 | Wan |
| 2016/0088251 A1 | 3/2016 | Luo et al. |
| 2016/0360127 A1 | 12/2016 | Dierickx et al. |
| 2017/0078594 A1* | 3/2017 | Kawabata ............ H04N 25/533 |
| 2017/0104946 A1 | 4/2017 | Hong |
| 2017/0339327 A1 | 11/2017 | Koshkin et al. |
| 2018/0288343 A1 | 10/2018 | McCarten et al. |

FOREIGN PATENT DOCUMENTS

| | | |
|---|---|---|
| GB | 2365650 B | 10/2004 |
| WO | 2007126288 A1 | 11/2007 |
| WO | 2019155699 A1 | 8/2019 |

OTHER PUBLICATIONS

Chen Xu et al., "A stacked global-shutter cmos imager with sc-type hybrid-gs pixel and self-knee point calibration single frame hdr and on-chip binarization algorithm for smart vision applications", 2019 IEEE International Solid-State Circuits Conference, San Francisco, CA, USA, Feb. 17-19, 2019.

Ams Datasheet "CMV12000 12Mp High Speed Machine Vision Global Shutter CMOS Image Sensor", https://look.amsosram.com/m/206ab59c8585c685/original/CMV12000-12Mp-High-Speed-Machine-Vision-Global-Shutter-CMOSImage-Sensor.pdf; downloaded Jul. 5, 2024, 85 pages.

Smartsens SC133GS Datasheet, https://www.gophotonics.com/products/cmos-imagesensors/smartsenstechnology/21-1025-sc133gs, 4 pages.

* cited by examiner

IMAGING DEVICE, OPTOELECTRONIC DEVICE AND METHOD FOR OPERATING AN IMAGING DEVICE

RELATED APPLICATIONS

This application is a US National Stage of International Application PCT/EP2023/052645, filed on 3 Feb. 2023 and claims priority under 35 U.S.C. § 119(a) and 35 U.S.C. § 365(b) from German patent application DE 10 2022 103 037.7 filed on 9 Feb. 2022, the contents of which are incorporated herein by reference in their entirety

FIELD

Various embodiments of the present disclosure relate to an image sensor, an optoelectronic device and a method for operating an image sensor.

BACKGROUND

CMOS image sensors are used in a wide range of applications, some of which require a high dynamic range (HDR). The dynamic range (DR) is defined as the ratio between the maximum and minimum signal that is acquired by the image sensor. Thus, the DR is limited on the one side by the noise floor at low light conditions, and by saturation effects at high light conditions on the other side.

Most of the available DR techniques are designed for rolling shutter pixels, but not being global shutter friendly. In global shutter mode, all the pixels of a pixel matrix are exposed within the same time period, the so-called exposure phase. At the end of this integration time, the charge transfer operations for all rows of the pixel matrix happen simultaneously. The signals are stored in a pixel-level memory and subsequently read out.

Some of the available DR techniques for global shutter pixels require a plurality of memory elements on pixel level. For example, storage capacitors are used as memory elements. Storage capacitors, however, require a large space within the pixel, such that the pixel size is increased. Thus, integrating a plurality of storage capacitors inside each pixel comes at the expense of a degraded image quality.

An object to be achieved is to provide an improved concept of an image sensor with a high dynamic range and a method for operating such an image sensor. A further object is to provide an optoelectronic device comprising the image sensor.

These objects are achieved with the subject-matter of the independent claims. Further developments and embodiments are described in dependent claims.

SUMMARY

Here and in the following, the term "pixel" refers to a light receiving element, which can be arranged in a two-dimensional lattice-type array, a matrix, with other pixels. Pixels in the array are arranged in rows and columns. The terms "row" and "column" can be used interchangeably, since they depend only on the orientation of the pixel array. The pixel might also include circuitry for controlling signals to and from the pixel. Thus, the pixel may form a so-called active pixel. The pixel may receive light in an arbitrary wavelength range. The term "light" may refer to electromagnetic radiation in general, including infrared (IR) radiation, ultraviolet (UV) radiation and visible (VIS) light, for example. Further, here and in the following, the terms "electrically connected" and "electrically coupled" may refer to a direct connection between two electrical components, i.e. to an electrical connection of two components without further components in between. Alternatively, it may also refer to an indirect electrical connection via further components. Generally, herein, "electrically connected" means a direct connection, while "electrically coupled" means an indirect connection.

The improved concept is based on the idea of operating an image sensor comprising a matrix of pixels, wherein a first group of pixels is read out following a first exposure scheme and a second group of pixels is read out following a second exposure scheme that includes two exposures. In other words, the image sensor is operated in a global shutter mode, wherein a triple exposure is globally realized.

In an embodiment, an image sensor comprises a pixel array having a first pixel group and a second pixel group, each pixel group comprising a plurality of pixels, with each pixel having a photosensitive element, a sense node and a sample-and-hold stage for sampling and storing signals from the sense node. The photosensitive element is configured to accumulate charge carriers by converting electromagnetic radiation. For example, the photosensitive element is a photodiode, in particular a pinned photodiode. The photosensitive element can also comprise two photodiodes or at least two photodiodes. The photodiode or the at least two photodiodes may be arranged in a substrate, in particular a semiconductor substrate. Photodiodes can detect electromagnetic radiation.

The sense node may be implemented as floating diffusion, FD, node. The sense node may thus be called FD node. The sense node comprises a capacitance. The capacitance forms a storage element of the pixel. The sense node may be formed by a doped well in the semiconductor substrate or by a storage capacitor. If the photodetector comprises more than one photodiode, the photodiodes may share a common sense node. The sense node can be coupled to the photodiode via a transfer switch. The transfer switch may be implemented as transistor and may be called in the following transfer transistor or transfer gate. The transfer transistor comprises a first terminal that is electrically connected to a terminal of the photodetector, in particular to a cathode terminal of the photodiode. A second terminal of the transfer transistor is electrically connected to the sense node. A gate terminal of the transfer transistor is configured to receive a transfer signal, e.g. from a driver circuit. By applying the transfer signal to the transfer gate the transfer transistor becomes conductive, such that charge carriers diffuse from the photodiode towards the sense node. By triggering the transfer towards the sense node, the integration time of the respective photodiode can be defined. If the photodetector comprises more than one photodiode, e.g. two photodiodes, each photodiode may be assigned to a respective transfer switch as described above.

The pixel further comprises a first source follower. The first source follower may also be called common-drain amplifier. A gate terminal of the first source follower is electrically connected to the sense node and a source terminal is coupled to an input of the sample-and-hold stage. A drain terminal of the first source follower may be electrically connected to a positive supply voltage source, VDD. The first source follower further comprises a source terminal, which is configured to provide an electrical signal based on the accumulated charge carriers from the photodetector. The first source follower may be used as voltage buffer and configured to buffer the signal, thus to decouple the sense node from the sample-and-hold stage. Thus, the first source follower can be seen as part of a regular 4T-pixel structure, which includes the first source follower to buffer a signal from the sense node for readout. The first source follower gate-source and gate-drain capacitance contributes to the capacitance of the sense node, i.e. partially defines properties such as a conversion gain of the sense node.

The sample-and-hold stage may be called S/H stage. In an embodiment, the S/H stage further comprises a switchable first capacitor and a switchable second capacitor. In particular, the S/H stage may comprise exactly two capacitors. For example, the capacitors may be implemented as metal-oxide-semiconductor (MOS) capacitors. Alternatively, the capacitors may be formed as metal-insulator-metal (MIM) capacitors. Further, the capacitors may be implemented as metal fringe capacitors or as so-called poly-N capacitors. That the capacitors are switchable can mean that a first terminal of each capacitor is electrically connected to a switch. For example, a first terminal of the first capacitor is electrically connected to a first switch, and a first terminal of the second capacitor is electrically connected to a second switch. A second terminal of the first capacitor and a second terminal of the second capacitor may be electrically connected to respective reference voltage source.

The first and the second capacitor may be arranged cascaded or in parallel. However, also alternative pixel architectures can be employed, as long as the sample-and-hold stage comprises at least two storage stages, e.g. two storage capacitors. The first and the second capacitor are electrically coupled to an output terminal of the first source follower. The output terminal of the first source follower may be the source terminal. In particular, the first terminal of the first capacitor is electrically coupled to the source terminal of the first source follower via the first switch, and the first terminal of the second capacitor is electrically coupled to the source terminal of the first source follower via the second switch (and via the first switch, if the capacitors are arranged cascaded). As such, electrical signals based on the charge signals generated at the photosensitive stage can be stored on the capacitors of the S/H stage. The S/H stage stores the electrical signals in a voltage domain. This can mean that the S/H stage stores altered versions of the charge signals from the photodetector. In particular, charge signals generated by the photodetector may be amplified or attenuated and/or transformed into respective voltage signals before being stored on capacitors of the S/H stage. It may be desired to store the signals in the voltage domain rather than in the charge domain for dark current (DC) reasons and to reduce the parasitic light sensitivity (PLS) of the pixel. Further, by the pixel intern storage capacitors, global shutter readout can be applied to each pixel. Thus, the pixel may form a global shutter (GS) pixel.

In an embodiment, each pixel further comprises a readout stage. An input of the readout stage is electrically coupled to an output of the sample-and-hold stage. A possible implementation of the readout stage is described below. The output of the S/H stage may be formed by the first terminal of the first capacitor and/or by the first terminal of the second capacitor. At the output of the S/H stage the electrical signals stored on the first and the second capacitor are provided. By means of the readout stage the electrical signals stored on the capacitors can be forwarded to a readout circuit. For example, the readout circuit comprises an ADC and/or control circuits. The readout circuit can be arranged on the same semiconductor substrate, or may be arranged on a separate chip. The readout circuit is not part of the pixel, but may be comprised by the imaging device.

In an embodiment, the image sensor further comprises a driver circuit that is, during an exposure phase, configured to operate the pixels of the first pixel group to perform a first exposure of a first duration, to transfer a first photo signal that is based on the first exposure from the photosensitive element to the sample-and-hold stage of the respective pixels, to operate the pixels of the second pixel group to perform a second exposure of a second duration, and to transfer a second photo signal that is based on the second exposure from the photosensitive element to the sample-and-hold stage of each pixel of the second pixel group. The driver circuit is, during the exposure phase and after the second exposure, further configured to operate the pixels of the second pixel group to perform a third exposure of a third duration, and to transfer a third photo signal that is based on the third exposure from the photosensitive element to the sample-and-hold stage of each pixel of the second pixel group.

For performing an exposure, the driver circuit can be configured to, in a first step during an idle duration, reset the photosensitive element to a predetermined level via opening the aforementioned transfer gate and a reset gate, such that a terminal of the photosensitive element is electrically connected to a known electrical potential. After the reset of the photosensitive element, the driver circuit can in a second step be configured to initiate the actual exposure by closing the transfer gate for an exposure duration. During the exposure duration, the reset gate can remain open for resetting the sense node to the predetermined manner.

After the exposure duration, for transferring the photo signal from the photosensitive element to the sample-and-hold-stage, the driver circuit can be configured to operate switches, e.g. the transfer gate and a switch of the sample-and-hold stage for electrically connecting the storage capacitor to the sense node and to the photodiode.

For performing the third exposure on the second pixel group, the driver circuit can be configured to repeat the abovementioned procedure on the respective pixels. The driver circuit is further configured to transfer and store the second and third photo signals in respective storage capacitors of the sample-and-hold stage.

In an embodiment, the image sensor further comprises an output circuit that is configured, during a readout phase, to read out the first photo signal from each pixel of the first pixel group, and to read out the second photo signal and the third photo signal from each pixel of the second pixel group. For example, the output circuit is configured to transfer the photo signals to a signal processing circuit for reconstructing an image from the photo signals. The reconstruction can be performed fully in the digital domain, for instance. For example, the readout circuit comprises an ADC and/or control circuits. The readout circuit can be arranged on the same semiconductor substrate, or may be arranged on a separate chip. The readout circuit is not part of the pixel, but may be comprised by the imaging device. The readout phase can be initiated after the exposure phase.

The improved concept has the advantage that existing pixel architectures, such as the 8T global shutter pixel architecture described in U.S. Pat. No. 8,754,357 B2, can be employed, wherein a triple exposure can be realized via performing a first exposure on a first pixel group, and a second and a third exposure on a second pixel group. Said pixel architecture is characterized by an extremely high parasitic light sensitivity, PLS, over the full visible and NIR wavelength range as well as a high blooming performance. Via the triple exposure, the noise particularly in low illumination conditions can be minimized compared to existing approaches. However, also alternative existing pixel architectures can be employed as long as the pixel includes a sample-and-hold stage with at least two storage stages.

Thus, a high dynamic range can be achieved without the need for additional components, such as additional bulky storage capacitors, and without the need to divide the pixels into more than two pixel groups.

In an embodiment, the pixels are arranged in a lattice-type array characterized by rows and columns, also called a matrix. Therein, the first pixel group is formed by pixels arranged in even rows of the lattice. Correspondingly, the second pixel group is formed by pixels arranged in odd rows of the lattice. The terms even and odd refer to row numbers and are thus a matter of definition.

The proposed even/odd readout method combines the advantages of a regular exposure and readout, e.g. a correlated double sampling, CDS, scheme, which is characterized by low noise, on the first pixel group with the ability to store two additional exposure levels on the pixels of the second pixel group, for instance. The resulting photo signals can be reconstructed using digital interpolation, for instance. Additional noise on the second pixel group, e.g. due to a non-CDS scheme can be minimized by performing a double sampling scheme, in which the signal level of the second exposure is directly used as the reference level of the third exposure, thus keeping additional noise contributions, such as 1/f noise, in the third exposure minimal. In particular, the readout of the photo signals is possible with a small overhead in circuitry compared to existing readout circuitries. It is in addition or alternatively possible to interleave pixels of the first and second pixel groups within a row. Besides forming the first and second pixel groups from odd and even rows of an image sensor, alternative arrangements can likewise be realized, forming the first and second pixel groups based on 2×2 or 4×4 CFA patterns.

In an embodiment, the first, second and third durations are distinct durations. Distinct durations for the three exposures lead to a true triple exposure and hence to an increased dynamic range compared to conventional approaches that rely on a dual exposure scheme. For example, the first, second and third durations can differ from each other by about an order of magnitude, e.g. factors between 8 and 12. The larger these factors, the larger the dynamic range of the image sensor.

In an embodiment, the second duration is the shortest duration. The driver circuit being configured to set the second duration as the shortest of the three durations has the advantage that the second photo signal level compared to the other exposures is closest to the reference level. Thus, its signal value can be used as reference value for the third exposure in an effective double sampling scheme when reconstructing the image after readout.

In an embodiment, the first duration is the longest duration. The driver circuit being configured to set the first duration as the longest of the three durations has the advantage that for the only exposure for the first pixel group according to the triple exposure scheme, an ideal CDS exposure can be performed, thus leading to the lowest noise for the long exposure image. This can be critical as the temporal noise in the long exposure image typically limits the final dark noise in the reconstructed HDR image.

Setting the first duration as the longest and the second duration as the shortest, thus setting the third duration as an intermediate exposure, achieves an optimal temporal and spatial noise trade-off. Besides the aforementioned low noise of the long exposure image, setting the second duration as the shortest allows for using its photo signal as a reference level for the intermediate third duration as an effective double sampling scheme. The short second exposure has the lowest signal-to-noise ratio, however, its impact in the reconstructed image is small as typically the short exposure image in an HDR scheme does not significantly contribute to dark noise in the reconstructed image.

In an alternative embodiment, the third duration is the longest duration. The driver circuit being alternatively configured to set the third duration as the longest of the three durations has the advantage that a speedy and power-conservative readout scheme can be performed on the second pixel group dependent on an output of the first pixel group. The intermediate exposure on the first pixel group can deliver information whether the captured scene has a high or low number of low-intensity regions, thus potentially rendering a readout of the short or long exposure photo signal unnecessary, respectively. As a result, during the reconstruction, only two instead of three analog-to-digital conversions have to be performed. In particular, a per-column or per-row decision on the readout strategy of the second pixel group could be realized for achieving a desired trade-off between dynamic range and readout speed as well as power consumption.

In an embodiment, the driver circuit is further configured, before the first exposure and the second exposure, to reset the photosensitive element of the pixels of the first and second pixel groups to a photosensitive element reset level, and before the transfer of the first photo signal and the transfer of the second photo signal, to reset the sense node of the pixels of the first and second pixel groups to a sense node reset level. Resetting the photosensitive element and the sense node to predetermined potential levels enables double sampling, DS, or correlated double sampling, CDS, schemes as a signal and a reference level can be sampled for noise subtraction purposes.

In an embodiment, the driver circuit is further configured not to reset the photosensitive element of the pixels of the second pixel group before the third exposure, and not to reset the sense node of the pixels of the second pixel group before the transfer of the third photo signal. In other words, no reset of the photosensitive element and the sense node are performed for the third exposure. This means that in addition to the first exposure as described above, also for the third exposure a true CDS exposure can be performed, however, at the expense of a decreased blooming performance and a high sense node PLS and dark current, DC, susceptibility.

In an embodiment, the driver circuit, during the exposure phase and after the first exposure, is further configured to operate the pixels of the first pixel group to perform a fourth exposure of a fourth duration, and to transfer a fourth photo signal that is based on the first exposure from the photosensitive element to the sample-and-hold stage of the respective pixels. The output circuit, during the readout phase, is further configured to read out the fourth photo signal from each pixel of the first pixel group. Performing a dual exposure also with pixels of the first pixel group analogous to that performed with pixels of the second pixel group enables a global quadruple exposure across the image sensor.

In an embodiment, the fourth duration is equal to the third duration. For example, the third and fourth durations are the longest durations, thus leading to a long exposure, while the first and second duration constitute short and intermediate exposures or vice versa. Such a scheme can be advantageous if full resolution for the longest exposure time is desirable, e.g. in low light intensity images. The readout of the first and fourth photo signals occurs analogously to that of the second and third photo signals of the second pixel group.

In an alternative embodiment, the first, second, third and fourth durations (T1, T2, T3, T4) are distinct durations. The driver circuit being configured to set all four durations differently leads to a true quadruple exposure, wherein a two-exposure scheme is realized in both the first and second pixel groups. Furthermore, the durations can be set such that there is an overlap of exposure occurring during the exposure phase.

In an embodiment, the driver circuit is further configured not to reset the photosensitive element of the pixels of the first pixel group before the fourth exposure, and not to reset the sense node of the pixels of the first pixel group before the transfer of the fourth photo signal. This is analogous to the above mentioned embodiment, in which no reset of photosensitive element and sense node is performed for the third exposure, thus leading to a true CDS exposure also for the fourth exposure. Therein, the driver circuit can be configured not to reset pixels of the first pixel group for the fourth exposure independent of whether pixels of the second pixel group for the third exposure are to be reset.

In an embodiment, each pixel further comprises a transfer gate connected between the photosensitive element and the sense node, a reset switch connected to the sense node for resetting the sense node to a predetermined voltage, and a first buffer amplifier having an input connected to the sense node. The pixel further comprises a second buffer amplifier having an input connected to the sample-and-hold stage.

In an embodiment, the sample-and-hold stage comprises a first storage stage connected to an output of the first buffer amplifier, which is selectively operable to sample a value of the sense node, and a second storage stage connected in parallel or in cascade with the first storage stage, which is selectively operable to sample a value of the sense node. An output of the first storage stage is connected to an input of the second storage stage.

The second buffer amplifier may also be called second common-drain amplifier. A gate terminal of the second buffer amplifier is electrically connected to the output of the sample-and-hold stage and may serve as input of the readout circuit. A drain terminal of the second buffer amplifier may be electrically connected to the positive supply voltage source, VDD. The second buffer amplifier further comprises a source terminal, which is configured to provide an electrical signal based on signals stored on the capacitors of the S/H stage. The second buffer amplifier may be used as voltage buffer and configured to buffer the signal, thus to decouple the S/H stage from the readout circuit. The second buffer amplifier may further be configured to amplify the stored voltage signals (low light signal, adjusted high light signal) and reset levels.

In an embodiment, the readout circuit further comprises a select switch. The select switch is electrically connected between an output terminal (the source terminal) of the second buffer amplifier and a column bus of the image sensor. The column bus may or may not be comprised by the pixel.

Alternatively, only a portion of the column bus is comprised by the pixel arrangement. The column bus may be common for each pixel of a column of pixels. The select switch may be implemented as select transistor. A first terminal of the select transistor is electrically connected to the source terminal of the second buffer amplifier. A second terminal of the select transistor is electrically connected to the column bus. The select transistor further comprises a select gate. By applying a select signal to the select gate the select transistor becomes conductive, such that a pixel output signal is forwarded via the column bus to the readout circuit. Thus, the pixel is provided with a global shutter voltage domain readout.

If the first and the second capacitors of the first and second sample stages are arranged cascaded the gate terminal of the second buffer amplifier is electrically connected to the first terminal of the second capacitor. However, in case that the first and the second capacitors are arranged in parallel, the readout stage may comprise a further second buffer amplifier and a further select switch. All features disclosed for the second buffer amplifier follower and the select gate are also disclosed for the further second buffer amplifier and the further select switch. The further second buffer amplifier may be electrically connected to the first terminal of the first capacitor via its gate terminal. The further select switch may be electrically connected to the source terminal of the further second buffer amplifier. However, the parallel arranged capacitors can also share a common second buffer amplifier by means of additional switches.

In an embodiment, the driver circuit is further configured to employ a correlated double sampling exposure for the first exposure. By setting the driver circuit to perform a reset of the photosensitive element before the first exposure and the sense node before the transfer of the first photo signal on the second pixel group, a true ideal CDS exposure can be performed, in which both a reference and a signal level are stored for the first exposure.

In an embodiment, the driver circuit is further configured to employ a correlated double sampling exposure for the third exposure. By setting the driver circuit not to perform a reset of the photosensitive element before the third exposure and of the sense node before the transfer of the third photo signal on the second pixel group, analogously to above, a true ideal CDS exposure can be performed, in which both a reference and a signal level are stored for the third exposure.

In an embodiment, during the readout phase, the output circuit is further configured to read out a reference signal as a third signal from each pixel of the second pixel group following a rolling readout procedure. For example, after reading out the second and third photo signals, the output circuit can be configured to reset the sense node of the pixels of the second pixel group to a sense node reset level and subsequently transfer this sense node reset level via the first source follower from the sense node to the sample-and-hold stage, in particular to a storage capacitor of the sample-and-hold stage. The output circuit then is configured to read out this sense node reset level as a reference level for the second exposure, for example. This readout can be performed as a rolling readout, i.e. row-by-row in a configuration, in which the second pixel group is formed by rows of an image sensor.

Furthermore, an optoelectronic device is provided that comprises the image sensor according to one of the embodiments described above. This means that all features disclosed for the image sensor are also disclosed for and applicable to the optoelectronic device and vice-versa.

The image sensor can be conveniently employed in optoelectronic devices, such as smart phones, tablet computers, laptops, or camera modules. Other applications include augmented reality (AR) and/or virtual reality (VR) scenarios. Further, the image sensor can be implemented in drones or scanning systems, as well as in industrial applications like machine vision. Further, the image sensor is in particular suited to be operated in global shutter mode, as the signals are stored in a pixel level memory. The global shutter mode is in particular suited for infrared applications, where the optoelectronic device further comprises a light source that is synchronized with the pixels. Thus, an optoelectronic device comprising such imaging device may also work in the infrared (IR) domain, for example for 3D imaging and/or identification purposes. Image sensors with infrared sensitivity can be used in dark environments where video feed is required. Such applications reach from mobile phone face unlock to driver monitoring systems. Both can deploy illuminators that are in the short-wave infrared (SWIR) or near-infrared (NIR) spectrum, so that the phone user/driver is not blinded by the light that is illuminating him/her.

Furthermore, a method for operating an image sensor is provided. The image sensor described above can be employed for the method for operating the image sensor described herein. This means that all features disclosed for the image sensor are also disclosed for the method for operating the image sensor and vice-versa.

In an embodiment, the method for operating an image sensor comprises, during an exposure phase by means of a driver circuit, operating the pixels of the first pixel group to perform a first exposure of a first duration, transferring a first photo signal that is based on the first exposure from the photosensitive element to the sample-and-hold stage of the respective pixels, operating the pixels of the second pixel group to perform a second exposure of a second duration, and transferring a second photo signal that is based on the second exposure from the photosensitive element to the sample-and-hold stage of each pixel of the second pixel group.

The method further comprises, after the second exposure, operating the pixels of the second pixel group to perform a third exposure of a third duration, and transferring a third photo signal that is based on the third exposure from the photosensitive element to the sample-and-hold stage of each pixel of the second pixel group.

During a readout phase by means of an output circuit, the method further comprises receiving the first photo signal from each pixel of the first pixel group, and receiving the second photo signal and the third photo signal from each pixel of the second pixel group.

Further embodiments of the method become apparent to the skilled reader from the embodiments of the image sensor described above, and vice-versa.

BRIEF DESCRIPTION OF THE DRAWINGS

The following description of figures may further illustrate and explain aspects of the image sensor and the method of operating such an image sensor. Components and parts of the image sensor that are functionally identical or have an identical effect are denoted by identical reference symbols. Identical or effectively identical components and parts might be described only with respect to the figures where they occur first. Their description is not necessarily repeated in successive figures.

In the figures.

DETAILED DESCRIPTION

Figure 1:
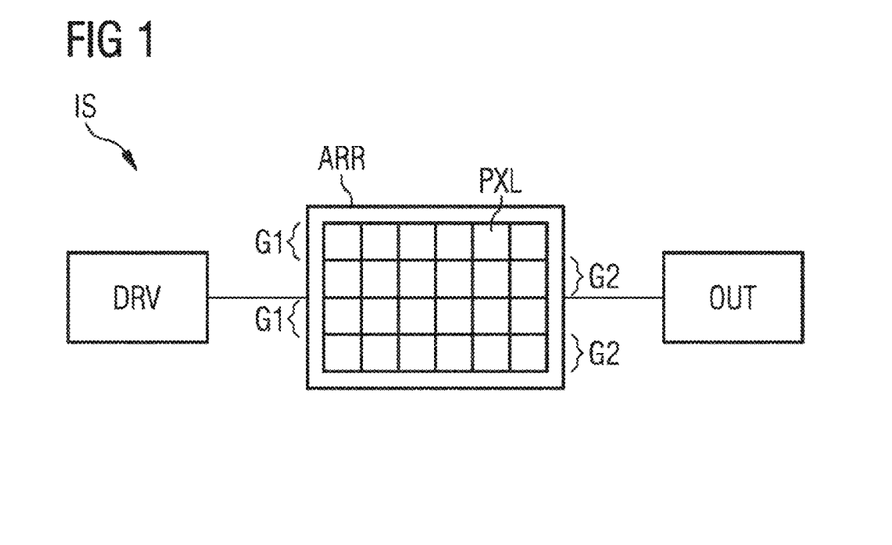
FIG. 1 shows an exemplary embodiment of an image sensor according to the improved concept.

FIG. 1 shows a block diagram of an exemplary embodiment of an image sensor IS.

The image sensor IS comprises a pixel array ARR having a plurality of pixels PXL arranged in a lattice-type, or matrix, configuration characterized by rows and columns. The pixels are arranged in first and second pixel groups G1, G2. In this embodiment, pixels arranged in even rows of the pixel array ARR are assigned to the first pixel group G1. Correspondingly, pixels arranged in odd rows of the pixel array ARR are assigned to the second pixel group G2. Alternative embodiments can feature other arrangements such as an interleaved arrangement, in which pixels of the first and second pixel groups G1, G2 are interleaved within rows and/or columns of the pixel array ARR, for instance. Alternatively, a larger granularities can be realized using different CFA schemes for forming the first and second pixel groups G1, G2. For example, the first and second pixel groups G1, G2 can be formed based on a 2×2 or 4×4 CFA scheme.

Figure 2:
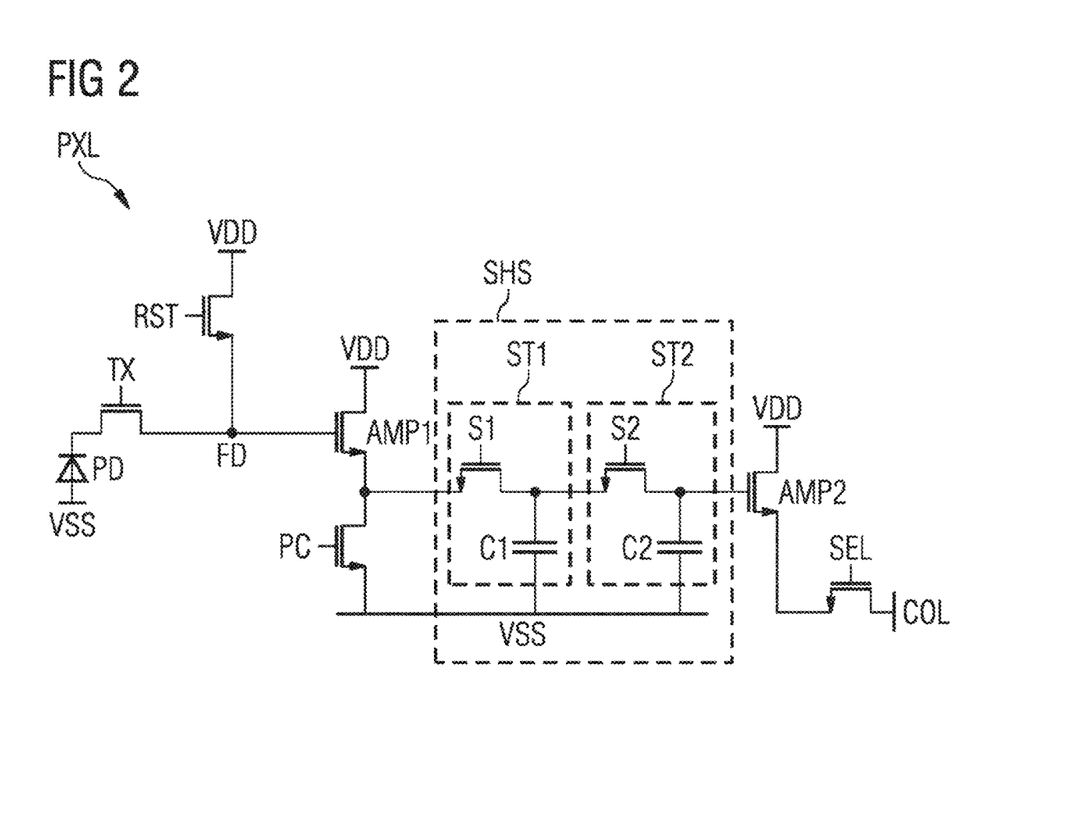
FIG. 2 shows an exemplary embodiment of a pixel comprised by an image sensor.

Each pixel PXL of the pixel array ARR comprises a photosensitive element PD configured to accumulate charge carriers by converting electromagnetic radiation. For example, the photosensitive element PD is a photodiode, in particular a pinned photodiode. Further, the pixel PXL comprises a sense node FD for collecting charge carries accumulated by the photosensitive element PD, and a sample-and-hold stage SHS for storing signals received from the sense node FD. An exemplary pixel architecture is illustrated in FIG. 2.

The image sensor IS further comprises a driver circuit DRV that is coupled to the pixels PXL of the pixel array ARR and is configured to operate the pixels PXL, i.e. switches of the pixels PXL, during an exposure phase for generating and storing photo signals in the sample-and-hold stage SHS of each pixel PXL.

Furthermore, the image sensor IS further comprises an output circuit OUT that is coupled to the pixels PXL of the pixel array ARR and is configured to operate the pixels PXL, i.e. switches of the pixels PXL and further readout circuitry of the image sensor, during a readout phase for transferring and processing signals stored in the sample-and-hold stage SHS of each pixel PXL.

The operation of the driver circuit DRV and the output circuit OUT are illustrated and detailed in FIGS. 3 to 10 and in the corresponding paragraphs of the disclosure.

FIG. 2 shows an exemplary embodiment of a pixel PXL employed in the pixel array ARR of the image sensor IS. For example, the pixel architecture is an 8T global shutter pixel architecture as described in U.S. Pat. No. 8,754,357 B2.

The pixel PXL in this embodiment comprises the photosensitive element PD and the sense node FD that is electrically coupled to the photosensitive element PD via a transfer switch TX. The photosensitive element PD may be implemented as a photodiode, in particular as a pinned photodiode. The photodiode PD comprises an anode terminal and a cathode terminal. An anode terminal of the photodiode PD is connected to a negative pixel supply voltage VSS, which can be ground GND. The photodiode PD may convert light of any wavelength, for example visible light, infrared light and/or ultraviolet light.

The transfer switch TX is arranged between the photodiode PD and the sense node FD. In the embodiment shown in FIG. 2, the transfer switch TX is implemented as a transfer gate transistor, e.g. a FET or MOSFET transistor or any alternative transistor architecture. A first terminal of the transfer switch TX is electrically connected to the cathode terminal of the photodiode PD. A second terminal of the transfer switch TX is electrically connected to the sense node FD. A transfer gate of the transfer switch TX is configured to receive a transfer signal from the driver circuit for transferring the respective charge signal from the photodiode PD to the sense node FD.

The sense node FD may be a floating diffusion node. The sense node FD can thus be associated with a capacitance, wherein a first terminal of the corresponding capacitor (not shown) is electrically connected to VSS or GND, and a second terminal of the capacitor is formed by the sense node FD.

The pixel PXL, in particular the photosensitive element PD, further comprises a reset switch RST electrically connected to the sense node FD for resetting the latter. In the embodiment shown, the reset switch RST is implemented as a reset transistor. A first terminal of the reset switch RST is electrically connected to a positive supply voltage source VDD. A second terminal of the reset switch RST is electrically connected to the sense node FD. A reset gate of the reset switch RST is configured to receive a reset signal from the driver circuit for resetting the sense node FD by applying the supply voltage and therefore removing any redundant charge carriers.

The pixel PXL further comprises a first source follower AMP1. For example, the first source follower AMP 1 is implemented as a common-drain buffer amplifier, wherein a gate terminal of the first source follower AMP1 is electrically connected to the sense node FD and a source terminal is coupled to an input terminal of the sample-and-hold stage SHS. A drain terminal of the first source follower AMP1 is connected to the positive supply voltage source VDD. At an output terminal, which is the source terminal, of the first source follower AMP1, an electrical signal can be provided that is based on the charge signals at the sense node FD.

The sample-and-hold stage SHS comprises a switchable first capacitor C1 and a switchable second capacitor C2 that are electrically coupled to an output terminal of the first source follower AMP1. The first capacitor C1 may be configured to store a first photo signal, and the second capacitor C2 may be configured to store a second photo signal. The first capacitor C1 comprises a first terminal and a second terminal, wherein the second terminal may be connected to a reference voltage source. Further, the second capacitor C2 comprises a first terminal and a second terminal, wherein the second terminal may likewise be connected to the reference voltage source. The reference voltage source may be VSS, GND or another supply voltage.

The sample-and-hold stage SHS further comprises a first switch S1 coupled between the source terminal of the first source follower AMP1 and the first terminal of the first capacitor C1. The first switch S1 may be implemented as a switching transistor. The first switch S1 comprises a gate terminal configured to receive a first switch signal from the driver circuit DRV for transferring an electrical signal towards the first capacitor C1. A first terminal of the first switch S1 is electrically connected to the output terminal of the first source follower AMP1. A second terminal of the first switch S1 is electrically connected to the first terminal of the first capacitor C1.

The sample-and-hold stage SHS further comprises a second switch S2 between the first terminal of the first capacitor C1 and the first terminal of the second capacitor C2. The second switch S2 may likewise be implemented as a switching transistor. The second switch S2 comprises a gate terminal configured to receive a second switch signal from the driver circuit DRV or the output circuit OUT for transferring an electrical signal towards the second capacitor C2. A first terminal of the second switch S2 is electrically connected to the first terminal of the first capacitor C1. A second terminal of the second switch S2 is electrically connected to the first terminal of the second capacitor C2. In other words, the first switch S1 and the first capacitor C1 form a first storage stage ST1, while the second switch S2 and the second capacitor C2 form a second storage stage ST2, wherein the storage stages ST1, ST2 are connected in a cascaded manner. Alternatively, the storage stages ST1, ST2 can be arranged in a parallel configuration. However, also alternative pixel architectures can be employed, as long a sample-and-hold stage is provided that comprises at least two storage stages, e.g. two storage capacitors.

The pixel PXL further comprises a precharge switch PC that is electrically connected to the output terminal of the first source follower AMP1. The precharge switch PC may be configured to provide a bias current to the first source follower AMP1, allowing it to act as a buffer of a signal stored on the sense node FD. The precharge switch PC may be implemented as a precharge transistor comprising a first terminal connected to the output terminal of the first source follower AMP1 and a second terminal connected to VSS.

The pixel PXL in a readout stage further comprises a second source follower AMP2, which comprises a gate terminal electrically connected to the first terminal of the second capacitor C2. A drain terminal of the second source follower AMP2 is connected to VDD. A source terminal of the second source follower AMP2 serves as output terminal.

The readout stage of the pixel PXL further comprises a select switch SEL between the output terminal of the second source follower AMP2 and a column bus COL. As shown, the select switch SEL may be implemented as select transistor comprising a first terminal connected to the output terminal of the second source follower AMP2 and a second terminal connected to the column bus COL. By applying, by means of the output circuit OUT, a select signal to a select gate of the select transistor SEL the signals stored on the capacitors C1, C2 can be forwarded to the column bus COL. The column bus COL may be common for all pixels PXL of a row of pixels within the pixel array ARR of the image sensor IS. The column bus COL may lead to the output circuit OUT (not shown).

Figure 3:
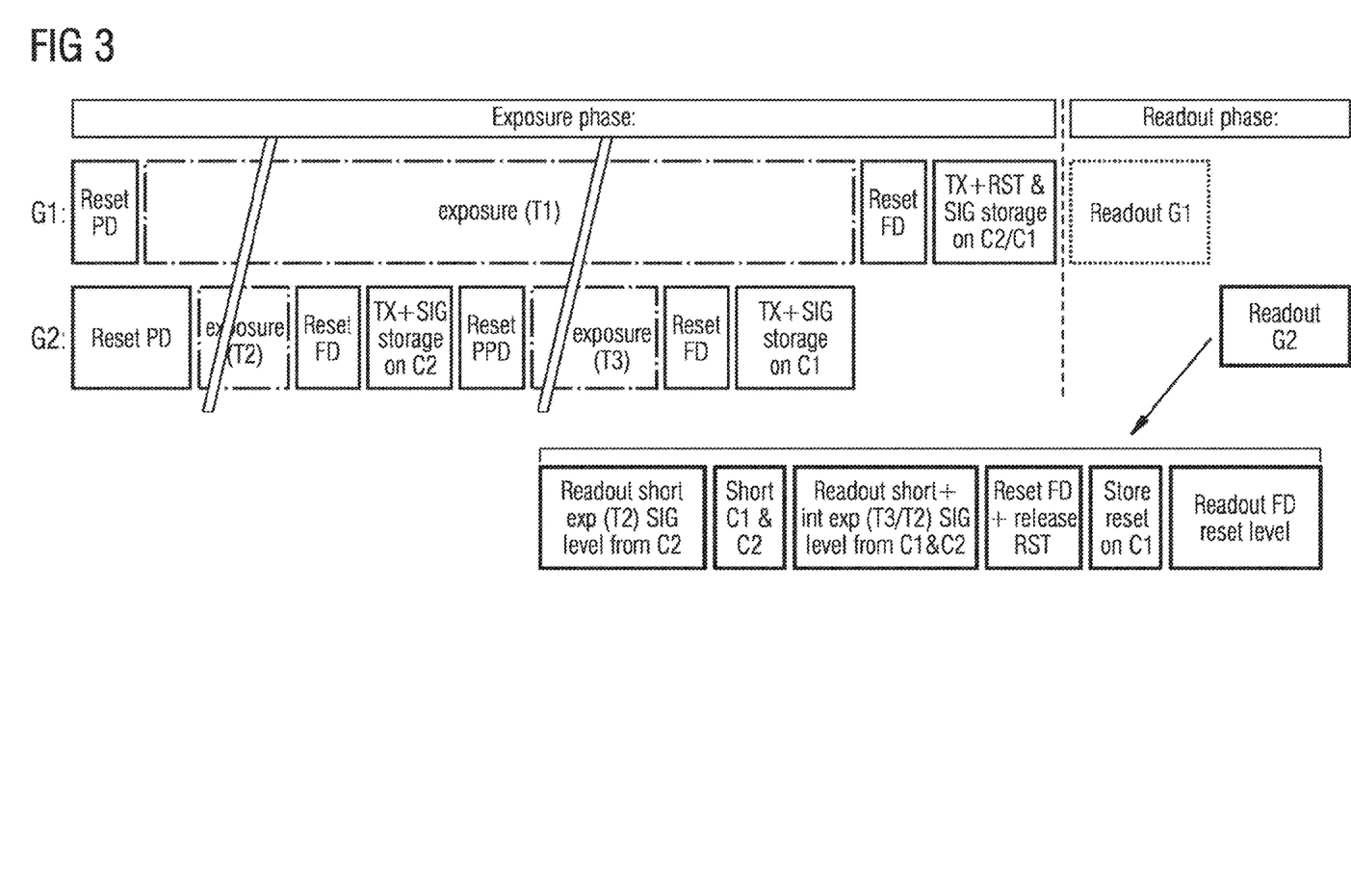
FIGS. 3 to 5 show exemplary timing diagrams of pixels of an image sensor.

FIG. 3 shows a schematic of a timing diagram of pixels of a first embodiment of an image sensor IS. The fundamental principle of operating the pixels PXL of an image sensor IS can be divided into an exposure (and storage) phase and into a subsequent readout phase. During the exposure phase, charge carriers are accumulated at the photosensitive element PD by converting electromagnetic radiation. These charges are transferred from the photosensitive element PD via the sense node FD to the sample-and-hold stage SHS for storage purposes. Therein, the sample-and-hold stage SHS, as mentioned before, comprises two storage stages ST1, ST2 for storing different signals, e.g. a reset level and a signal level according to a correlated double sampling, CDS, scheme.

The exposure phase is followed by a readout phase, during which the signals stored in the sample-and-hold stage SHS of each pixel PXL are transferred by means of the output circuit, to an image processing unit of the image sensor.

Figure 6:
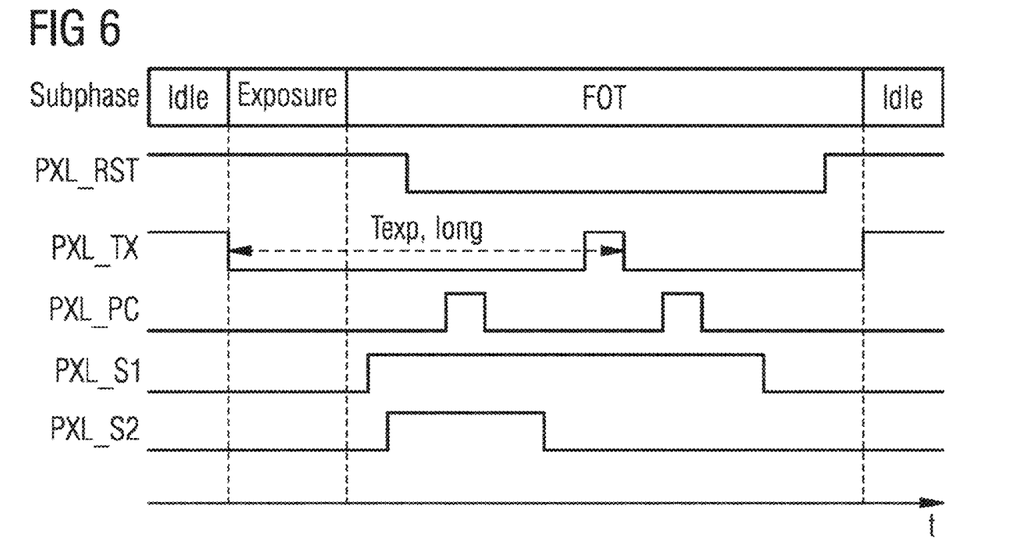
FIGS. 6 to 8 show exemplary timings of signals applied to the pixels of an image sensor during an exposure phase.

In detail, the embodiment shown in FIG. 3 shows the exposure and readout schemes applied to the first and second pixel groups G1, G2. In this embodiment, the pixels PXL of the first pixel group G1 are operated by the driver circuit DRV according to a conventional correlated double sampling scheme. According to this, initially the photosensitive element PD is reset to a known level. Afterwards, the driver circuit DRV initiates the actual first exposure by starting the integration period, in this case of a duration T1. Subsequently or concurrently, the sense node FD is reset to the known level, which is transferred and stored as a first reset signal RST long to the sample-and-hold stage SHS, e.g. to a second capacitor C2 of a second storage stage ST2. A second signal corresponding to the collected photo charges is then transferred and stored as a first photo signal SIG long to the sample-and-hold stage SHS, e.g. to a first capacitor C1 of a first storage stage ST1. FIG. 6 shows a corresponding example of control signals applied to the pixels PXL of the first pixel group G1 by means of the driver circuit DRV based on the pixel architecture of FIG. 2.

Figure 7:
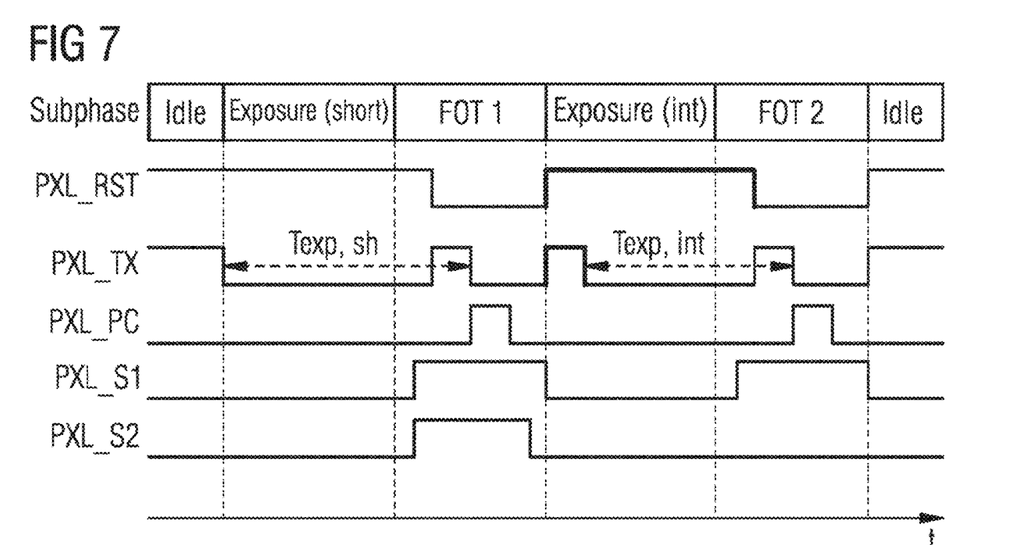

For the second pixel group G2, the aforementioned exposure scheme is basically performed twice in a row on each pixel PXL. In detail, after the initial reset of the photosensitive element PD, a second exposure of duration T2 is initiated by the driver circuit DRV. A signal corresponding to the collected photo charges during the second exposure is then transferred and stored as the second photo signal SIG short to the sample-and-hold stage SHS, e.g. to a second capacitor C2 of a second storage stage ST2. Afterwards, the photosensitive element is reset before initiating the third exposure of duration T3. A signal corresponding to the collected photo charges during the third exposure is then also transferred and stored as the third photo signal SIG int to the sample-and-hold stage SHS, e.g. to a first capacitor C1 of a first storage stage ST1. FIG. 7 shows a corresponding example of control signals applied to the pixels PXL of the second pixel group G2 by means of the driver circuit DRV based on the pixel architecture of FIG. 2. For example, the exposure duration T1 is the longest and the exposure duration T2 is the shortest of the durations T1, T2 and T3. For example, the exposure durations T1, T2, T3 differ from each other by factors of 8 to 12.

Figure 9:
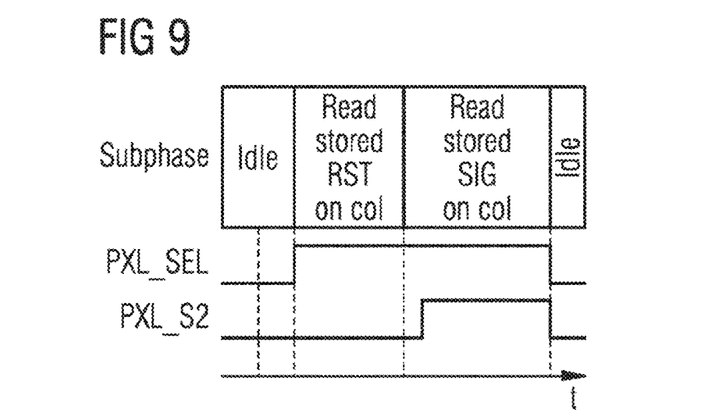
FIGS. 9 to 10 show exemplary timings of signals applied to the pixels of an image sensor during a readout phase.

During the readout phase, the pixels PXL of the first pixel group G1 are read out following a correlated double sampling scheme, in which first the reset level RST long followed by the signal level SIG long are read out by the output circuit OUT and supplied to an image processing unit for reconstructing an image, for instance. FIG. 9 shows a corresponding example of control signals applied to the pixels PXL of the first pixel group G1 by means of the output circuit OUT based on the pixel architecture of FIG. 2.

Figure 10:
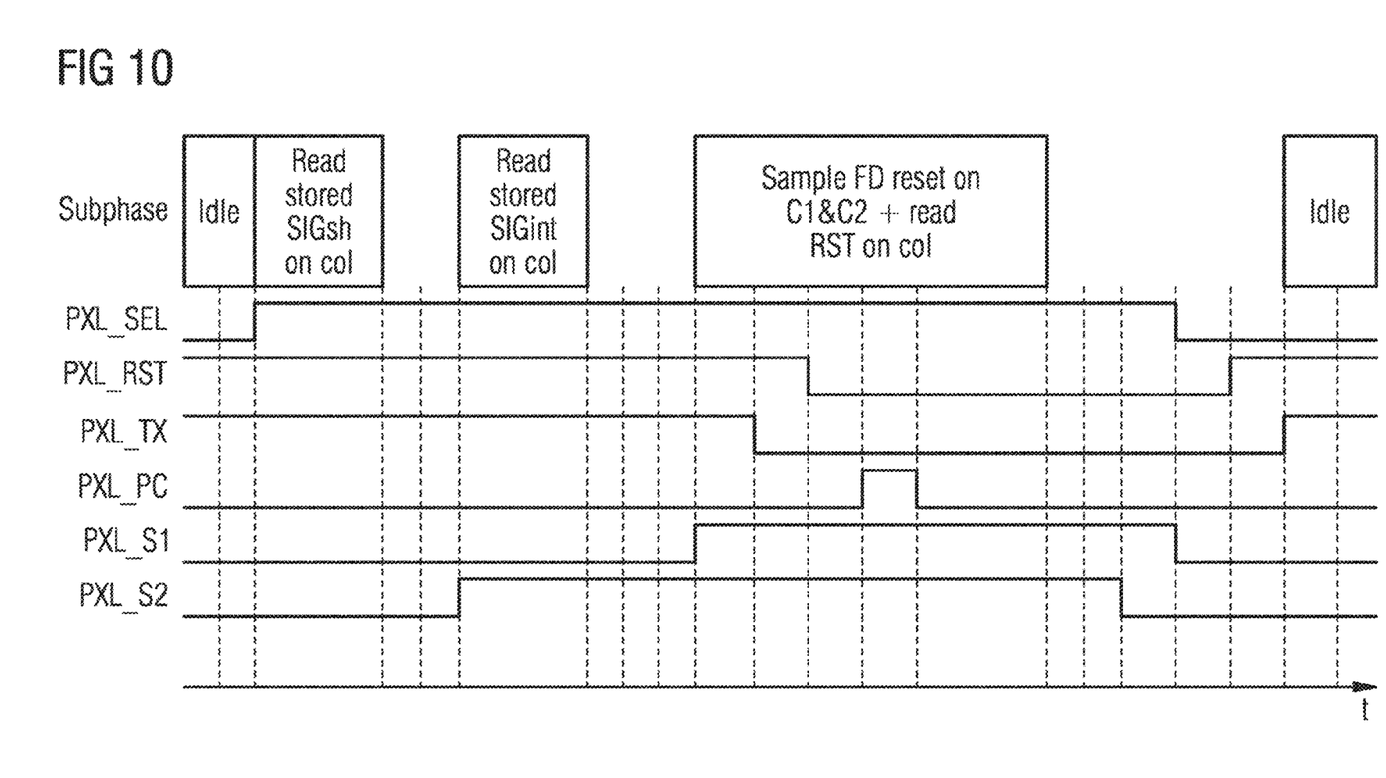

The pixels PXL of the second pixel group G2 are read out following a non-correlated double sampling scheme, in which first the signal level SIG short of the second exposure of duration T2, in this case the short exposure, is read out. Afterwards, with reference to the pixel architecture of FIG. 2, the storage capacitors C1, C2 are shorted for reading out the signal level SIG int of the third exposure of duration T3, in this case the intermediate exposure. A reset level RST short of the sense node FD is stored to the sample-and-hold-stage SHS, e.g. to the first capacitor C1, for enabling an effective double sampling readout for the second exposure. Analogously, due to the significantly shorter duration T2 compared to T3, the photo signal SIG short can be used as effective reference reset level RST int for enabling an effective double sampling readout also for the third exposure during the image reconstruction. FIG. 10 shows a corresponding example of control signals applied to the pixels PXL of the second pixel group G2 by means of the output circuit OUT based on the pixel architecture of FIG. 2.

The operating scheme of FIG. 3 realizes a triple exposure HDR operation of the image sensor IS, in which a long exposure image is captured via a CDS protocol using the first pixel group G1, whereas the pixels PXL of the second pixel group G2 perform a dual exposure for supplying short and intermediate according to an effective double sampling protocol. As all photo signals are stored on proper storage nodes with suitable parasitic light sensitivity, PLS, global shutter artifacts are kept to a minimum. In other words, no charge storage is performed on non-ideal storage nodes, such as the sense node FD, over prolonged time periods. This is because signals stored on such nodes can be easily corrupted by e.g. DC integration (high temperature use cases) or poor PLS (high illumination)

Furthermore, an ideal trade-off is achieved concerning temporal and spatial noise (fixed-pattern noise, FPN) via the different images: the long exposure image features the lowest noise due to a true CDS scheme. This is critical as temporal noise during the long exposure ultimately limits the final dark noise (dark current, DC) in the reconstructed HDR image. The intermediate exposure image (duration T3) shows deteriorated noise performance compared to the long exposure image, however due to the effective double sampling scheme with the signal level of the short exposure taken as a reference level as described above, this additional noise is significantly reduced. The short exposure image (duration T2) shows the worst noise performance, however also being limited owing to the effective double sampling. However, the short exposure image typically has the lowest impact on the reconstructed image in an HDR scheme, as the readout noise in high-illumination scenes is limited by photon-shot noise, i.e. it is independent from the readout.

The presented scheme poses no additional requirements on existing sense node FD and transfer switch TX designs, hence conventional pixel architectures such as the 8T architecture can be employed in an image sensor IS according to the improved concept. Therefore, also the blooming performance is maintained as the existing 8T anti-blooming path remains intact. In addition, compared to conventional HDR approaches, the improved concept requires no sensitive analog threshold comparisons as the signal reconstruction can occur entirely in the digital domain. Finally, the scheme of FIG. 3 allows for a pipelined readout using only limited additional hardware in the analog column readout path.

Figure 4:
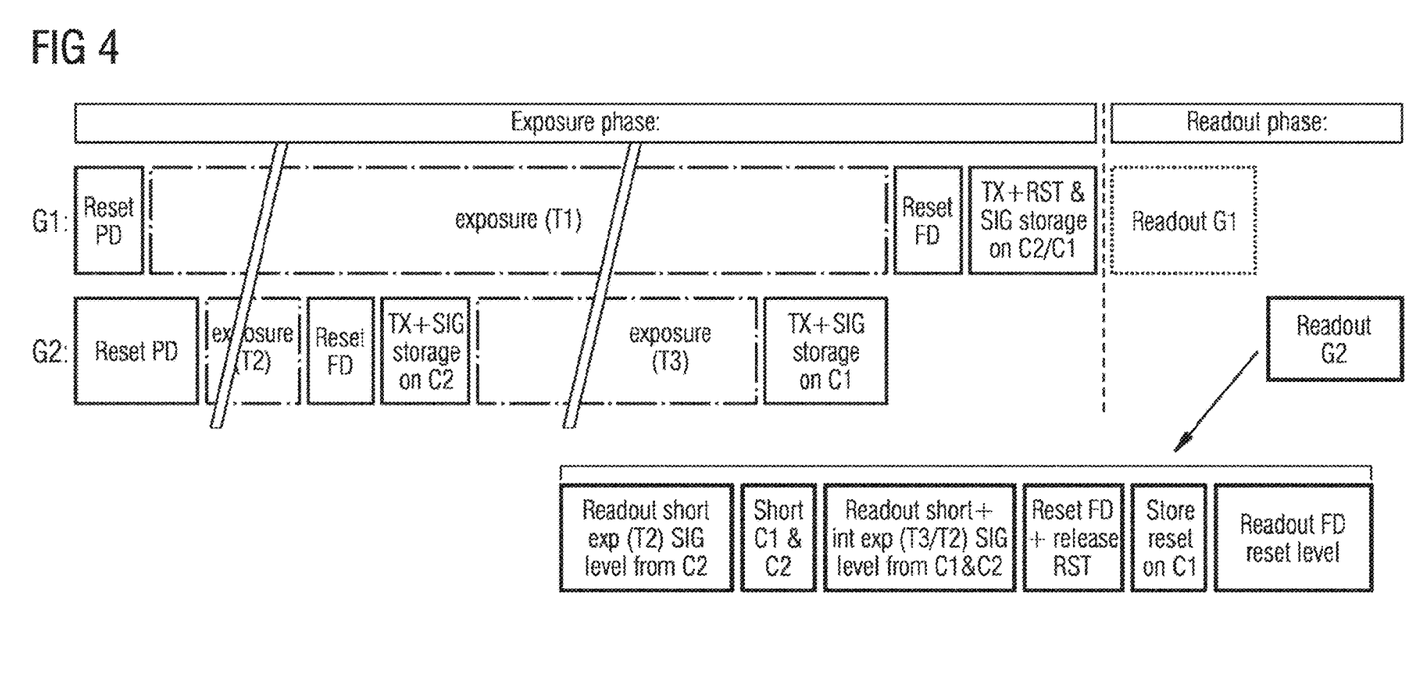
Figure 8:
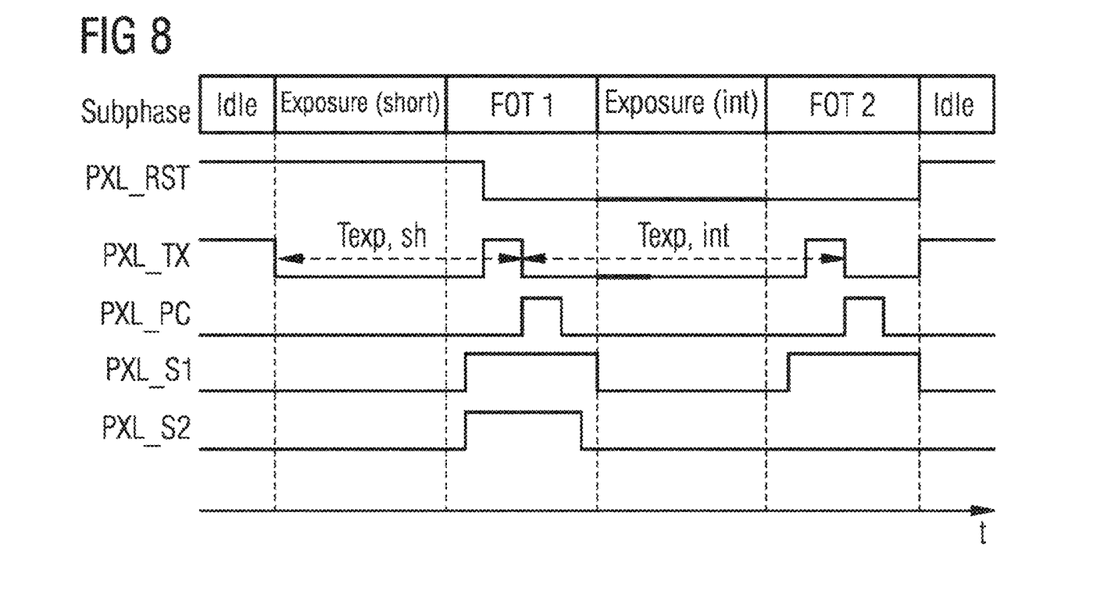

FIG. 4 shows a schematic of a timing diagram of pixels of a second embodiment of an image sensor IS. Compared to the first embodiment of FIG. 3, in this embodiment the driver circuit DRV is configured not to reset the photosensitive element PD and the sense node FD for the third exposure, hence leaving particularly the sense node FD floating. This allows for a true CDS protocol also for the third exposure of duration T3, as the photo signal SIG short of the short exposure of duration T2 now directly serves as the reference level of the intermediate third exposure of duration T3. This leads to also the intermediate exposure image showing ideal noise performance, hence leading to an even higher dynamic range of the image reconstructed using the three exposures. However, the downside of this scheme is that a pipelined readout during the third (intermediate) exposure phase is no longer possible. Furthermore, this scheme is subject to a degraded blooming performance and a high DC/PLS susceptibility of the sense node FD. FIG. 8 for the second embodiment shows a corresponding example of control signals applied to the pixels PXL of the second pixel group G2 by means of the driver circuit DRV based on the pixel architecture of FIG. 2.

For the first and second embodiments of FIGS. 3 and 4, it can be also considered to set, by means of the driver circuit DRV, the duration of the first exposure T1 as the intermediate exposure, while the duration of the third exposure T3 is set as the longest exposure. Such a scheme could be utilized in order to enhance the speed and the power efficiency of the image sensor. For example, the output circuit OUT can be configured in a first step to read out the photo signals of the first pixel group G1, in this case the intermediate exposure. From these values, it could be determined, whether the second or the third exposure is to be read out from the second pixel group G2. For instance, the photo signals of the first pixel group G1 can indicate whether the captured image is high or low in intensity, thus potentially rendering a readout of the short or long exposure as unnecessary. As a result, compared to the scheme of FIGS. 3 and 4, in this case merely a single analog-to-digital conversion from the second pixel group G2 needs to be performed instead of two conversions if both exposure signals are to be read out from the second pixel group. For example, a per-row or per-column decision can be employed for still ensuring a sufficient dynamic range. However, setting the long exposure duration as the third exposure potentially leads to higher dark noise in the reconstructed image as, particularly following the scheme of FIG. 3, the third exposure experiences to CDS readout protocol.

Figure 5:
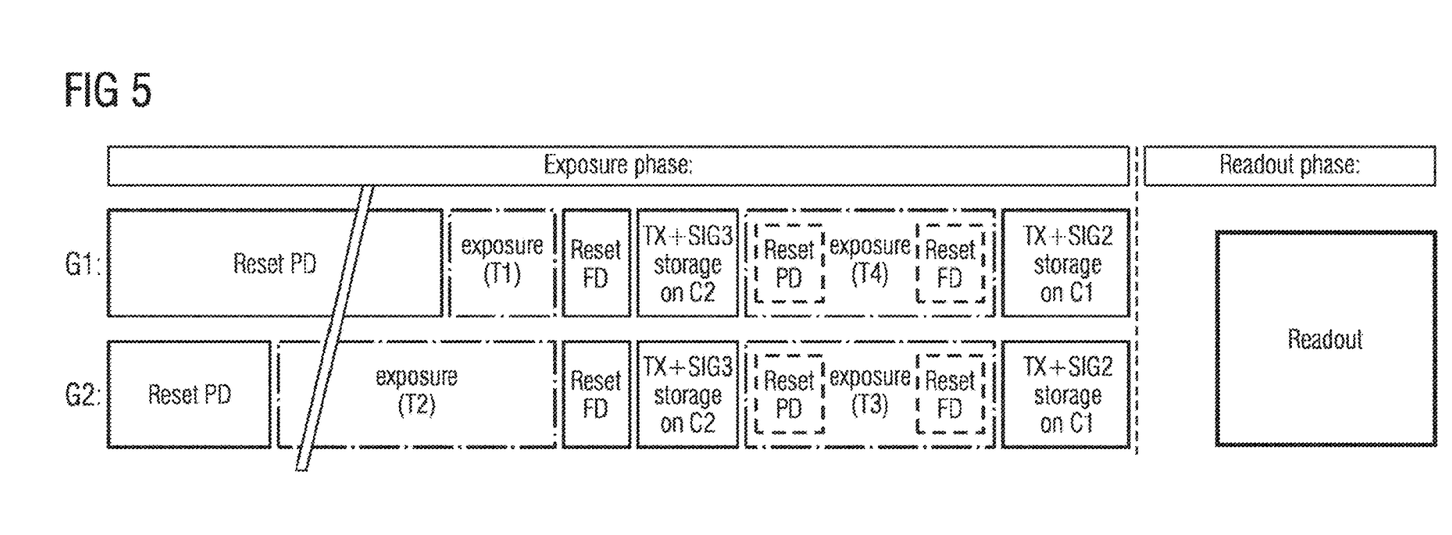

FIG. 5 shows a schematic of a timing diagram of pixels of a third embodiment of an image sensor IS. Compared to the first and second embodiments of the previous figures, in this embodiment also on the first pixel group G1 two exposures are performed (according to the pixels of the second group G2 in either of FIGS. 3 and 4).

For example, the duration T4 of the fourth exposure can be set to equal the duration T3 of the third exposure to correspond to a long exposure, while the first and second exposures with durations T1 and T2 are set as short and intermediate exposures, respectively. This leads to a triple exposure, wherein for the longest exposure time full resolution for the reconstructed image is achieved. This can be of particular interest for low-light situations, however requiring de-interlacing in high-intensity situations.

Alternatively, the durations T1, T2, T3 and T4 can be set to be different from each other for realizing a quadruple exposure. This enables even larger HDR at the cost of deteriorated noise performance due to interpolation errors on all photo signals. However, the third and fourth exposures can be performed analogous to the third exposure of FIG. 4, in which a CDS scheme is enabled for the third exposure by not resetting the sense node FD.

FIG. 6 shows an example of control signals applied to the pixels PXL of the first pixel group G1 during the exposure phase by means of the driver circuit DRV based on the pixel architecture of FIG. 2 and the first and second embodiments of an image sensor IS of FIGS. 3 and 4. In particular, FIG. 6 shows the timing of the reset signal PXL_RST, the transfer signal PXL_TX, the precharge signal PXL_PC, the first switch signal PXL_S1, and the second switch signal PXL_S2. These signals can be in an activated state (high state), in which the switch is closed, i.e. a corresponding gate of a transistor is open, or in a deactivated state (low state), in which the switch is open, i.e. a corresponding gate of a transistor is closed. Applying or activating the respective signal can mean that the signal is switched to the activated state. Deactivating the respective signal can mean that the signal is switched to the deactivated state. In the following, the timing is explained in more detail using selected subphases shown in the figure.

As mentioned above, the pixels PXL of the first pixel group G1 are operated by the driver circuit DRV according to a conventional correlated double sampling scheme. During an idle subphase the photosensitive element PD and the sense node FD are first reset to a predetermined reset level by having both the reset switch RST and the transfer switch TX closed, i.e. by opening the gates of said transistors, via activated transfer and reset signals PXL_TX, PXL_RST generated by the driver circuit DRV.

The driver circuit DRV then initiates the actual exposure subphase by starting the integration period of a duration T1, here Texp, long indicating the long-exposure portion of an HDR image. The exposure is initiated by opening the transfer switch TX via deactivating the transfer signal PXL_TX, which defines the starting point of the integration period.

At the beginning of the subsequent storage subphase, frame overhead time (FOT) subphase, into which the integration time extends, the first and second switches S1, S2 are closed and the precharge switch PC is pulsed a first time via a pulse of the precharge signal PXL_PC. By pulsing the precharge switch PC, the reset level of the sense node FD is buffered via the first source follower AMP1 to the second capacitor C2, after which the second switch signal PXL_S2 is deactivated for opening the second switch S2. Thus, the reset signal is stored on the second capacitor C2.

At the end of the integration time, the transfer signal PXL_TX is activated, which means that an amount of charge carriers is transferred from the photosensitive element PD to the sense node FD. The amount of charge carriers may correspond to charge carriers that have been generated within the photosensitive element PD in response to electromagnetic radiation during the integration time. The opening of the transfer switch TX by deactivating the transfer signal PXL_TX marks the end of the integration time. At this point, the precharge switch PC is pulsed a second time in order to buffer a first photo signal corresponding to the amount of charge carriers from the sense node FD via the first source follower AMP1 to the first capacitor C1 of the sample-and-hold stage SHS. The first switch S1 is eventually opened by deactivating the first switch signal PXL_S1, Thus, the first photo signal is stored on the first capacitor C1.

The storage subphase is followed by the idle phase, in which both the transfer switch TX and the reset switch RST are closed for resetting the photosensitive element PD and the sense node FD for a subsequent exposure. However, before the subsequent exposure, the signals stored in the capacitors C1, C2 are readout during a readout phase, which is detailed in FIG. 9 for the first pixel group G1.

FIG. 7 shows a corresponding example of control signals applied to the pixels PXL of the second pixel group G2 during the exposure phase by means of the driver circuit DRV based on the pixel architecture of FIG. 2 and the first embodiment of an image sensor IS of FIG. 3. In particular, FIG. 7 shows, like FIG. 6, the timing of the reset signal PXL_RST, the transfer signal PXL_TX, the precharge signal PXL_PC, the first switch signal PXL_S1, and the second switch signal PXL_S2.

In contrast to the first pixel group G1, the pixels PXL of the second pixel group according to the embodiment of FIG. 3 perform two exposures of durations T2, here Texp, sh indicating the short-exposure portion of an HDR image, and T3, here Texp, int indicating the intermediate-exposure portion of an HDR image.

The working principle of the pixel operation corresponds to that of the first pixel group G1. During a first storage subphase FOT1, after the second exposure the precharge switch PC is pulsed a first time in order to buffer a second photo signal corresponding to the amount of charge carriers generated during the second exposure from the sense node FD via the first source follower AMP1 to the second capacitor C2 of the sample-and-hold stage SHS. The second switch S2 is then opened by deactivating the second switch signal PXL_S2, Thus, the second photo signal is stored on the second capacitor C2.

After also opening the first switch S1, the photosensitive element PD and the sense node FD are reset by activating the transfer and reset signals PXL_TX, PXL_RST. During a second storage subphase FOT2, after the third exposure the precharge switch PC is pulsed a second time in order to buffer a third photo signal corresponding to the amount of charge carriers generated during the third exposure from the sense node FD via the first source follower AMP1 to the first capacitor C1 of the sample-and-hold stage SHS. The first switch S1 is then opened by deactivating the second switch signal PXL_S1, Thus, the third photo signal is stored on the first capacitor C1.

The subsequent readout of the second pixel group G2 is detailed in FIG. 10.

FIG. 8 shows a corresponding example of control signals applied to the pixels PXL of the second pixel group G2 during the exposure phase by means of the driver circuit DRV based on the pixel architecture of FIG. 2 and the second embodiment of an image sensor IS of FIG. 4. In particular, FIG. 8 shows, like FIGS. 6 and 7, the timing of the reset signal PXL_RST, the transfer signal PXL_TX, the precharge signal PXL_PC, the first switch signal PXL_S1, and the second switch signal PXL_S2.

In contrast to the timing diagram of FIG. 7, in this second embodiment of an image sensor, IS, the pixels PXL of the second pixel group G2 are not reset for the third exposure. In other words, the reset and transfer signals PXL_RST, PXL_TX are not activated after the second exposure. This leaves the sense node FD floating during the third exposure, leading in turn to a true correlated double sampling of the third exposure. This is due to the fact that the signal level of the second exposure can now directly serve as the reset level of the third exposure.

FIG. 9 shows an example of control signals applied to the pixels PXL of the first pixel group G1 during the readout phase by means of the output circuit OUT based on the pixel architecture of FIG. 2 and the first and second embodiments of an image sensor IS of FIGS. 3 and 4. In particular, FIG. 9 shows the timing of the select signal PXL_SEL and the second switch signal PXL_S2. These signals can be in an activated state (high state), in which the switch is closed, i.e. a corresponding gate of a transistor is open, or in a deactivated state (low state), in which the switch is open, i.e. a corresponding gate of a transistor is closed. Applying or activating the respective signal can mean that the signal is switched to the activated state. Deactivating the respective signal can mean that the signal is switched to the deactivated state. In the following, the timing is explained in more detail using selected subphases shown in the figure.

As mentioned above, the pixels PXL of the first pixel group G1 are read out by the output circuit OUT according to a correlated double sampling scheme. After an idle subphase, first the reset signal is read from the second capacitor C2 of the pixels PXL of the first pixel group G1 by activating the select switch signal PXL_SEL. This way, the reset signal is buffered from the second capacitor C2 via the second source follower AMP2 to the column bus COL and from there transferred to a first storage node of the readout circuit OUT. The potential level at this reset storage node due to the reset signal can be defined as $VRST_{long}$, indicating the reset level of the long exposure image of an HDR image.

Subsequently, the first photo signal is read from the first capacitor C1 of the pixels PXL of the first pixel group G1 by activating the second switch signal PXL_S2. This way, the first photo signal is buffered from the first capacitor C1 via the second source follower AMP2 to the column bus COL and from there transferred to a signal storage node of the readout circuit OUT. The potential level at the signal storage node due to the first photo signal can be written as: $VRST_{long}-\Delta VSIG_{long}/2$. Therein, the factor of 2 is due to the fact that the first and second capacitors C1, C2, which are typically of equal capacitance, are shorted when closing the second switch S2 during the readout of the first capacitor C1.

The resulting long exposure image signal $V_{cds,long}=-\Delta VSIG_{long}/2$ can be calculated, by means of digital signal processing via the output circuit OUT, in a straightforward manner via the difference of the abovementioned reset and photo signals.

FIG. 10 shows an example of control signals applied to the pixels PXL of the second pixel group G2 during the readout phase by means of the output circuit OUT based on the pixel architecture of FIG. 2 and the first embodiment of an image sensor IS of FIG. 3. In particular, FIG. 10 shows the timing of the select signal PXL_SEL, the reset signal PXL_RST, the transfer signal PXL_TX, the precharge signal PXL_PC, the first switch signal PXL_S1, and the second switch signal PXL_S2.

For the second pixel group G2, the second photo signal from the second exposure is first read from the second capacitor C2 of the pixels PXL of the second pixel group G2 by activating the select switch signal PXL_SEL. This way, the second photo signal is buffered from the second capacitor C2 via the second source follower AMP2 to the column bus COL and from there transferred to a first signal storage node of the readout circuit. The potential level at this first signal storage node due to the second photo signal can be written as: $VRST_{short}-\Delta VSIG_{short}$, indicating the signal level of the short exposure image of an HDR image.

Subsequently, the third photo signal is read from the first capacitor C1 of the pixels PXL of the second pixel group G2 by activating the second switch signal PXL_S2. This way, the third photo signal is buffered from the first capacitor C1 via the second source follower AMP2 to the column bus COL and from there transferred to a second signal storage node of the readout circuit OUT. The potential level at the second signal storage node due to the third photo signal can be written as: $VRST_{int}-(\Delta VSIG_{short}+\Delta VSIG_{int})/2$. Therein, the factor of 2 is again due to the fact that the first and second capacitors C1, C2, which are typically of equal capacitance, are shorted when closing the second switch S2 during the readout of the first capacitor C1.

Finally, the reset level of the sense node FD of the pixel PXL is sampled to the first and second capacitors C1, C2 via pulsing the precharge switch PC. The stored reset level is then buffered row-by-row in a rolling shutter manner from the first and second capacitors C1, C2 of each pixel PXL of the second pixel group G2 via the second source follower AMP2 to the column bus COL and from there transferred to a reset storage node of the readout circuit OUT. The potential level at this reset storage node due to the reset level of the sense node FD can be written as: $VRST_{direct}$.

The resulting short exposure image signal $$V_{ds,short} = -2 * \frac{\Delta VSIG_{short}}{2} + \Delta RST_{short,direct}$$

and intermediate exposure image signal $$V_{ds,int} = \frac{1}{2} * (\Delta VSIG_{short} - \Delta VSIG_{int}) + \Delta RST_{short,int} =$$

$$-\left(1 - \frac{T_2}{T_3}\right) * \frac{\Delta VSIG_{int}}{2} + \Delta RST_{short,int}$$

can be calculated, by means of digital signal processing via the output circuit OUT, from the differences of the above-mentioned signals stored in the reset storage node and in the first and second signal storage nodes. To this end, the signal level of the short exposure is also utilized as reset level of the intermediate exposure, such that both exposures can be read out following an effective double sampling scheme. For the calculation, a constant scene and illumination is assumed, such that: $\Delta VSIG_{short}=T_2/T_3 \Delta VSIG_{int}$, with the second and third exposure durations T2 and T3. It is also noted that a large time difference can exist between the sampling moment of the $VRST_{short}$ and $VRST_{direct}$ sampling levels. As these levels are sampled from the sense node FD, and due to the importance of 1/f noise generation at the sense node FD, $\Delta RST_{short,direct}=VRST_{short}-VRST_{direct}$ can be affected by this noise presence.

Furthermore, when reading out the full image array, the noise integration time, i.e. the time difference between sampling of the $VRST_{short}$ during FOT and $VRST_{direct}$ during the rolling readout, increases from row to row, resulting in a larger noise contribution in the last rows being read out, compared to the first rows being read out. As this $\Delta RST_{short,direct}$ noise component affects the short exposure image, which is dominated by the shot noise component of the short exposure signal value, the relative importance of this noise contribution likely is not dominant.

A similar noise contribution will be present in the $\Delta RST_{short,int}$ term, though with a shorter integration time, as both $VRST_{short}$ and $VRST_{int}$ samples are sampled during the FOT. As both samplings occur simultaneously across the full array, the noise integration time will be constant from row to row.

For the embodiment of the image sensor IS according to FIG. 4, a true CDS readout can be performed for the third exposure as the sense node FD is kept floating during the third exposure. Thus, the signal level of the second exposure serves as true reset level for the third exposure.

For the embodiment of the image sensor IS according to FIG. 5, an exposure scheme analogous to that illustrated in FIG. 7 and a readout scheme analogous of that illustrated in FIG. 10 are employed also for the first pixel group G1, which performs the first exposure followed by a fourth exposure.

The embodiments of the image sensor IS and the method of operating such an image sensor IS disclosed herein have been discussed for the purpose of familiarizing the reader with novel aspects of the idea. Although some embodiments have been shown and described, changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

REFERENCES

IS image sensor
ARR pixel array
PXL pixel
G1 first pixel group
G2 second pixel group
DRV driver circuit
OUT output circuit
PD photosensitive element
FD sense node
PC precharge switch
SHS sample-and-hold stage
TX transfer switch
RST reset switch
SEL select switch
COL column bus
VDD positive supply voltage
VSS negative supply voltage
GND ground
AMP1 first source follower (buffer amplifier)
AMP2 second source follower (buffer amplifier)
ST1 first storage stage
ST2 first storage stage
S1 first switch
S2 second switch
C1 first capacitor
C2 second capacitor
T1 first duration
T2 second duration
T3 third duration
T4 fourth duration

What is claimed is:

1. An image sensor comprising:
   a pixel array having a first pixel group and a second pixel group, each pixel group comprising a plurality of pixels, with each pixel having a photosensitive element, a sense node and a sample-and-hold stage,
   a driver circuit that is, during an exposure phase, configured to:
     operate the pixels of the first pixel group to perform a first exposure of a first duration,
     transfer a first photo signal that is based on the first exposure from the photosensitive element to the sample-and-hold stage of the respective pixels,
     operate the pixels of the second pixel group to perform a second exposure of a second duration,
     transfer a second photo signal that is based on the second exposure from the photosensitive element to the sample-and-hold stage of each pixel of the second pixel group, after the second exposure, operate the pixels of the second pixel group to perform a third exposure of a third duration, and
transfer a third photo signal that is based on the third exposure from the photosensitive element to the sample-and-hold stage of each pixel of the second pixel group, and
an output circuit configured to, during a readout phase:
read out the first photo signal from each pixel of the first pixel group, and
read out the second photo signal and the third photo signal from each pixel of the second pixel group,
wherein the exposure phase and the readout phase are separate phases.

2. The image sensor according to claim 1, wherein
the pixels are arranged in a lattice-type array characterized by rows and columns,
the first pixel group is formed by pixels arranged in even rows of the lattice, and
the second pixel group is formed by pixels arranged in odd rows of the lattice.

3. The image sensor according to claim 1, wherein the first, second and third durations are distinct durations.

4. The image sensor according to claim 1, wherein the second duration is the shortest duration.

5. The image sensor according to claim 4, wherein the first duration is the longest duration.

6. The image sensor according to claim 4, wherein the third duration is the longest duration.

7. The image sensor according to claim 1, wherein the driver circuit is further configured:
before the first exposure and the second exposure, to reset the photosensitive element of the pixels of the first and second pixel groups to a photosensitive element reset level, and
before the transfer of the first photo signal and the transfer of the second photo signal, to reset the sense node of the pixels of the first and second pixel groups to a sense node reset level.

8. The image sensor according to claim 7, wherein the driver circuit is further configured:
not to reset the photosensitive element of the pixels of the second pixel group before the third exposure, and
not to reset the sense node of the pixels of the second pixel group before the transfer of the third photo signal.

9. The image sensor according to claim 1, wherein the driver circuit, during the exposure phase, is further configured to:
after the first exposure, operate the pixels of the first pixel group to perform a fourth exposure of a fourth duration, and
transfer a fourth photo signal that is based on the first exposure from the photosensitive element to the sample-and-hold stage of the respective pixels,
and the output circuit, during the readout phase, is further configured to read out the fourth photo signal from each pixel of the first pixel group.

10. The image sensor according to claim 9, wherein the fourth duration is equal to the third duration.

11. The image sensor according to claim 9, wherein the first, second, third and fourth durations are distinct durations.

12. The image sensor according to claim 9, wherein the driver circuit is further configured:
not to reset the photosensitive element of the pixels of the first pixel group before the fourth exposure, and
not to reset the sense node of the pixels of the first pixel group before the transfer of the fourth photo signal.

13. The image sensor according to claim 1, wherein each pixel further comprises:
a transfer switch connected between the photosensitive element and the sense node,
a reset switch connected to the sense node for resetting the sense node to a predetermined voltage,
a first buffer amplifier having an input connected to the sense node,
the sample-and-hold stage comprising:
a first storage stage connected to an output of the first buffer amplifier, which is selectively operable to sample a value of the sense node, and
a second storage stage connected in cascade with the first storage stage, which is selectively operable to sample a value of the sense node, wherein an output of the first storage stage is connected to an input of the second storage stage, and
a second buffer amplifier having an input connected to the second storage stage.

14. The image sensor according to claim 1, wherein the driver circuit is further configured to employ a correlated double sampling scheme for the first exposure.

15. The image sensor according to claim 1, wherein the driver circuit is further configured to employ a correlated double sampling scheme for the third exposure.

16. The image sensor according to claim 1, wherein during the readout phase, the output circuit is further configured to read out a reference signal as a third signal from each pixel of the second pixel group following a rolling readout procedure.

17. An optoelectronic device comprising the image sensor according to claim 1.

18. A method for operating an image sensor comprising a pixel array having a first pixel group and a second pixel group, each pixel group comprising a plurality of pixels, with each pixel having a photosensitive element, a sense node and a sample-and-hold stage, the method comprising:
during an exposure phase, by means of a driver circuit
operating the pixels of the first pixel group to perform a first exposure of a first duration,
transferring a first photo signal that is based on the first exposure from the photosensitive element to the sample-and-hold stage of the respective pixels,
operating the pixels of the second pixel group to perform a second exposure of a second duration,
transferring a second photo signal that is based on the second exposure from the photosensitive element to the sample-and-hold stage of each pixel of the second pixel group,
after the second exposure, operating the pixels of the second pixel group to perform a third exposure of a third duration, and
transferring a third photo signal that is based on the third exposure from the photosensitive element to the sample-and-hold stage of each pixel of the second pixel group, and
during a readout phase, by means of an output circuit
receiving the first photo signal from each pixel of the first pixel group, and
receiving the second photo signal and the third photo signal from each pixel of the second pixel group,
wherein the readout phase is initiated after the exposure phase.

* * * * *